United States Patent [19]

Lieberman

[11] Patent Number: 5,070,400
[45] Date of Patent: Dec. 3, 1991

[54] PAY-TV TIME PURCHASE SCHEME

[75] Inventor: Daniel Lieberman, Gaithersburg, Md.

[73] Assignee: Comsat, Washington, D.C.

[21] Appl. No.: 300,701

[22] Filed: Jan. 19, 1989

Related U.S. Application Data

[63] Continuation of Ser. No. 67,852, Jun. 30, 1987, abandoned.

[51] Int. Cl.$^5$ .............................................. H04N 7/10
[52] U.S. Cl. ........................................... 358/84; 455/2
[58] Field of Search .................... 358/84, 349; 380/10, 380/16, 20; 455/2, 4

[56] References Cited

U.S. PATENT DOCUMENTS

| | | | |
|---|---|---|---|
| 3,327,051 | 6/1967 | Bass . | |
| 3,508,005 | 4/1970 | Hamburger | 358/84 |
| 3,531,586 | 9/1970 | Bass et al. | 358/84 |
| 3,813,482 | 5/1974 | Blonder . | |
| 3,890,461 | 6/1975 | Vogelman et al. . | |
| 4,081,832 | 3/1978 | Sherman | 358/84 X |
| 4,115,807 | 9/1978 | Pires | 358/84 X |
| 4,225,884 | 9/1980 | Block et al. | 358/84 X |
| 4,245,245 | 1/1981 | Matsumoto et al. | 358/84 X |
| 4,268,859 | 5/1981 | Ost | 358/84 X |
| 4,325,078 | 4/1982 | Seaton et al. . | |
| 4,348,696 | 9/1982 | Beier . | |
| 4,484,217 | 11/1984 | Block et al. | 358/84 |
| 4,710,955 | 12/1987 | Kauffman | 358/84 X |
| 4,712,238 | 12/1987 | Gilhousen et al. | 380/20 |
| 4,759,060 | 7/1988 | Hayashi et al. | 358/84 X |

FOREIGN PATENT DOCUMENTS

| | | | |
|---|---|---|---|
| 128555 | 12/1984 | European Pat. Off. | 358/84 |
| 0153837 | 9/1985 | European Pat. Off. . | |
| 60-171880 | 9/1985 | Japan | 358/84 |
| 86/01962 | 3/1986 | PCT Int'l Appl. | 358/84 |

Primary Examiner—Jin F. Ng
Assistant Examiner—Wing F. Chan
Attorney, Agent, or Firm—Sughrue, Mion, Zinn, Macpeak & Seas

[57] ABSTRACT

A pay television subscriber pays for viewing credits which are transmitted to the subscriber equipment from a central office. Each program is associated with a pulse having a rate corresponding to the charge per unit time for that program, and the viewing credits are debited appropriately.

15 Claims, 2 Drawing Sheets

PAY-TV TIME PURCHASE SCHEME

This application is a continuation of application Ser. No. 07/067,852 filed Jun. 30, 1987, now abandoned.

BACKGROUND OF THE INVENTION

The present invention is directed to pay television systems, and more particularly to a technique for facilitating impulsive buying by subscribers to a pay television system.

Direct Broadcast Satellite (DBS) systems such as shown in FIG. 2 wherein multiple programs area transmitted from a central station to a plurality of subscribers via satellite.

Impulse buying is generally defined for purchase of optional programs which can be subscribed to with limited advanced notice, such as first run movies, special events, etc. These special programs are sold at a premium, generating increased revenue above that of the normal subscription service revenue.

Impulse buying can have other applications as well, such as in a pay-per-event service in which the event is supported only by direct payment. By this method, the program producer is paid a share of the revenue required by the pay television organization, rather than being paid a fixed fee. A side benefit to this payment method is feedback to the pay television system of the types of programs a subscriber is willing to support.

Another application of impulse buying is to have the subscriber pay for a television service only according to use, and using it only as desired. The television service essentially becomes a resource, similar to a telephone or electricity, or particularly a postage meter.

The resource concept has not previously been implemented in the pay television industry, for a variety of reasons. First, it is difficult to implement in existing pay-TV systems. These systems would require extensive re-work for proper implementation of the resource concept. Second, present pay-TV services are directed to a mass market, one which is not discriminating in its television viewing, and one which is amenable to the usual practice whereby the subscriber pays a fixed fee for a quantity of standard programs and/or an additional fee for specified programs, sometimes referred to as "premium" programs. The premium programs are often purchased on a "tiering" basis. Impulsive buying is difficult if not impossible.

There is a need, then, for a technique whereby impulsive buying is facilitated, without excessive complication from the viewpoint of the system operator.

The DBS system is a new type of service, one which will have to compete with existing television communications services. As part of this competition, it is important to identify new target markets of discriminating TV viewers, viewers willing to support a "narrow casting" television service. Buying TV time, similar to the purchase of telephone time, could be attractive to the new DBS audience and could generate substantial revenues for the Direct Broadcast Operator.

SUMMARY OF THE INVENTION

According to the present invention, storage devices, e.g., non-volatile memories, at the subscriber equipment store "viewing credits" corresponding to the amount of viewing time for which the subscriber has paid. Each program is associated with a charge per unit time, and the viewing credits are debited at an appropriate rate as long as the subscriber is tuned to that program. When the remaining viewing credits run low, a visual indicator is provided to the subscriber, who may then telephone the central office and request that the viewing credit memories be replenished for which he will later be billed. In the preferred embodiment, safeguards are provided to prevent unauthorized free viewing. e.g., by monitoring the memory debiting circuitry to verify proper operation.

BRIEF DESCRIPTION OF THE DRAWINGS

The invention will be more clearly understood from the following description in conjunction with the accompanying drawings, wherein.

DETAILED DESCRIPTION OF THE INVENTION

While the present invention may be referred to as an impulse buying system in that it facilitates impulse buying, it would more accurately be referred to as "pay-per-time" (PPT) system. Each program is allotted units of time, with the number of units depending upon the quality and anticipated demand of the program. As an example, a highly-rated first-run movie may command 10 units for each hour of its two hour length, while an average television program may command 0.5 units per hour. The subscriber can purchase a desired number of units per month, above a fixed minimum and up to a specified limit, and then use the units as desired. As an example, if 60 units are purchased, then the subscriber can either watch three two-hour quality shows (6 hours) each month, 120 hours per month of average television programming or a mix of the two. The important point is that the subscriber watches only what he wants to watch. Essentially, the subscriber self-regulates television viewing and its charges.

There are several elements needed for implementation of a PPT scheme in a DBS system. A control channel is needed for down-loading information of purchased time to the subscriber decrypter. The down-loaded information will be unique to each subscriber, although there need not be a dedicated channel for each subscriber since a common channel can be shared with appropriate multiplexing.

A further requirement is some non-volatile storage of paid-up time in the subscriber decrypter storage, which can be incremented remotely and decremented locally. In addition, it is preferable to institute safeguards in order to recognize failures in the down-loading of information, to prevent attempts by subscribers to falsely allege that the system operator has not updated the paid-up time in accordance with purchase payments made, and also to assure that accidental failure of circuitry does not provide subscribers with a "free ride."

Lastly, some indication must be provided to the subscriber regarding the status of the time allotment.

The PPT method and apparatus need not be complex or expensive. Certain safeguards such as described above would add a degree of complexity and cost, depending on the level of protection desired.

Figure 1:
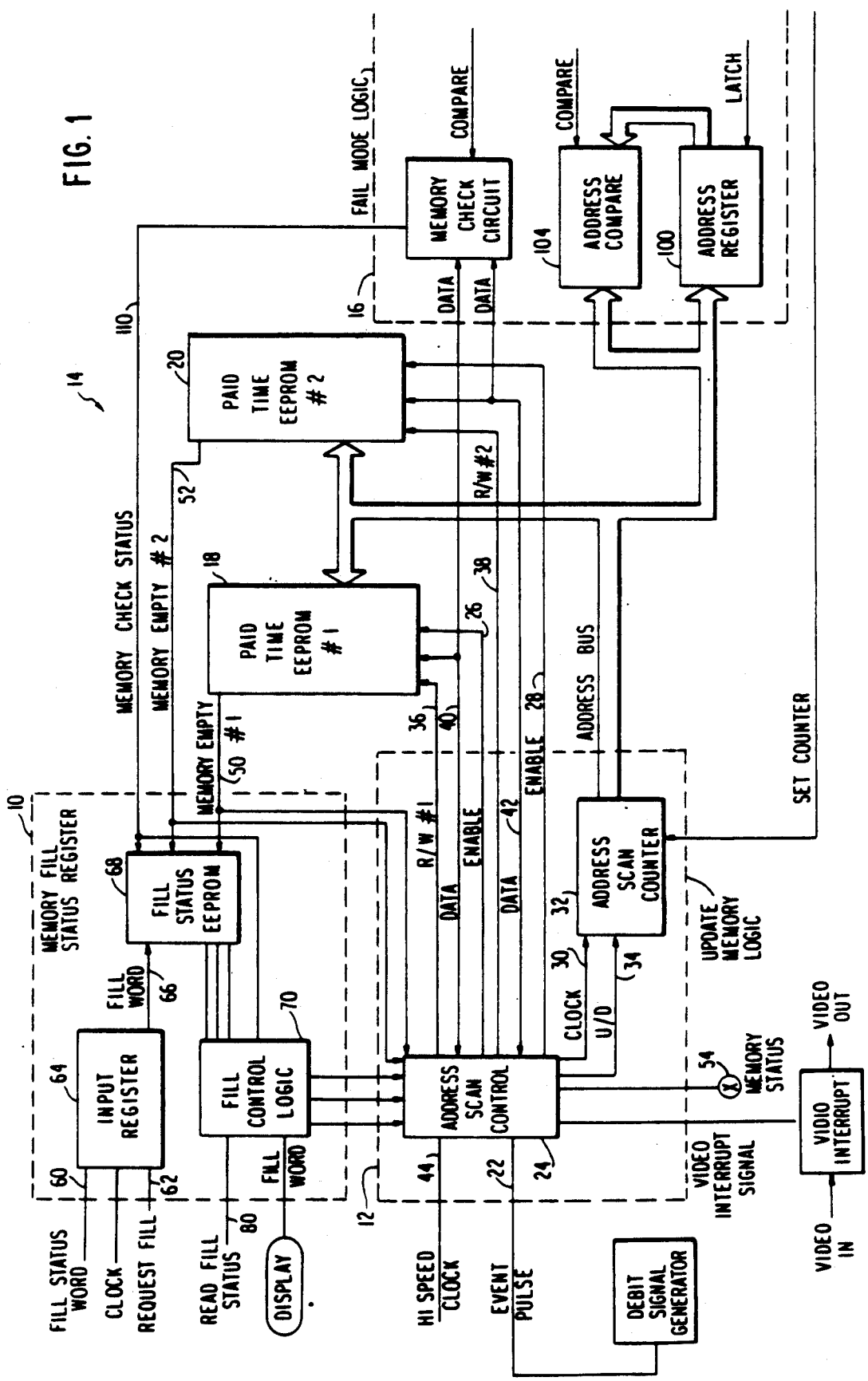
FIG. 1 is a block diagram for describing the essential components of an embodiment of the present invention.
Figure 2:
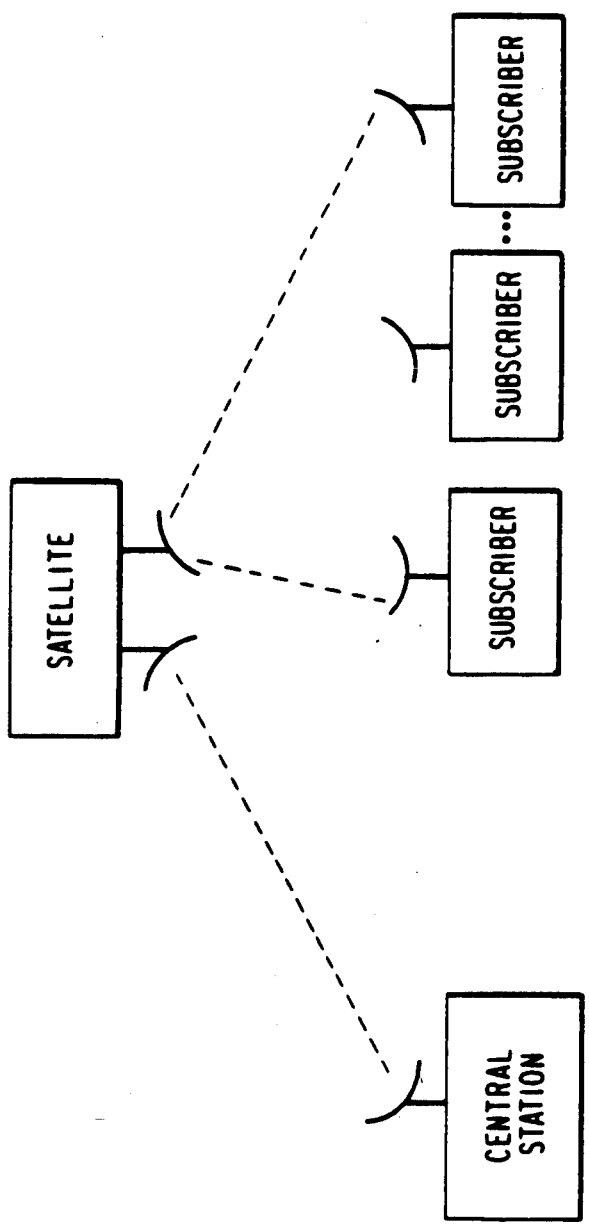
FIG. 2 is a brief diagram of an overall subscriber television system in which the present invention may be used.

One example of a preferred embodiment of the invention will now be described with reference to FIG. 1, although it should be emphasized that the embodiment of FIG. 1 is given by way of example only. The arrangement of FIG. 1 essentially comprises a memory fill status register 10, update memory logic 12, non-volatile storage 14 and fail mode logic 16. Storage for "paid-up time" is provided by the non-volatile storage 14, which in the preferred embodiment comprises a pair of 2 Kbit EEPROMs. When there is no paid-up time remaining in one of the memories 18 or 20, that memory stores a 1 at all address locations. The amount of paid-up time in a memory corresponds to the number of address locations which store zeros.

The description of the invention will begin with both of the memories 18 and 20 full. An event pulse is generated on line 22 at a frequency dependent on the cost of the program being viewed. This can be accomplished in any of a number of ways. For example, the channel selection device at the subscriber unit may generate event pulses at different rates for different channels. A disadvantage of this, however, would be the requirement that any channel always convey programs of the same cost, unless the pulse generating circuitry is controllable from the broadcasting station.

An alternative would be to monitor the station to which each subscriber is tuned, and to then send a "program word" (PW) to each subscriber over a Control Channel. The frequency of the PW would depend on the cost of the program, or the word could appear at a constant rate but have a value corresponding to a charge rate, with the PW then being used to program an event pulse generator at the subscriber equipment.

A still simpler technique may be to simply include the PW in the video signal itself, thus eliminating the need at the central station to monitor the channel to which each subscriber is tuned.

Updating of the memories 18 and 20 by the Update Memory Logic is accomplished as follows. First of all, the address scan control logic 24 within the Update Memory Logic 12 will normally control memories 18 and 20 via enable lines 26 and 28, respectively, such that only one is enabled at any given time, e.g., by coupling lines 26 and 28 to complementary outputs of a flip-flop. The logic 24 also enables reading or writing of the memories via signals on lines 36 and 38, respectively, while receiving or providing data on lines 40 and 42, respectively.

At power "turn-on", the counter 32 is set to a maximum count value. When an event pulse appears, the address scan control logic 24 generates a high frequency clock with which the address scan counter counts down, the signal on line 34 normally indicating a down count. As the addresses of the memory 18 (EEPROM #1) are counted down, the contents of the memory are read on line 36. When a "0" is read by the scan logic 24, the scan clock is halted and a "1" is substitute in that memory location. After this initial quick scan by the scan counter 32, the rate of the address scan clock on line 30 is reduced to that of the event pulses. With each event pulse, the address scan counter is decremented one count. At each count, the memory 18 is addressed and updated with a deduction of one unit of paid-time by replacing a "0" with a "1" in the address location.

The lowest memory location in each of memories 18 and 20 is hardwired to a respective signal line 50 or 52 which are coupled to the scan control logic 24. When scan logic 24 detects a "1" on line 50 indicating that the memory 18 is empty, the status of lines 26 and 28 are reversed, so that memory 20 is thereafter accessed. At the same time, control logic 24 illuminates a memory status indicator 54, e.g., an LED. Also, the address counter 32 will recycle to its maximum count value and begin a high speed countdown as described above, searching for the first location in memory 20 at which a "0" is detected. This recycling of the scan counter 32 to its maximum value will occur automatically, assuming that the counter 32 is of the same capacity as each of the memories 18 and 20. If it is a larger counter, appropriate presetting circuitry could be included in the update memory logic.

Upon seeing the illuminated state of the memory status indicator 54, the subscriber can telephone the central office and request further time credit. A fill status word can then be sent from the central office to the subscriber, appearing on line 60. While not necessary for the practice of the present invention, the system in which the present invention is used may employ an encryption scheme whereby a Key Of the Month (KOM) must be transmitted periodically to the subscriber. In such case, the fill status word may be included with the KOM when the latter is transmitted to the subscriber. The fill status word preferably consists of a "fill" bit and a date code.

Detection of the "fill" bit by the subscriber's decryption equipment indicates that the subscriber "paid time" memory must be updated. A "request fill" code is then forwarded by the decryption equipment on line 62 to the input register 64, where it is combined with the date from the fill status word to form a "fill word". The register 64 then provides the fill word as an output on line 66 to the fill status memory 68. The memory 68 then stores the "request fill" code together with the date of the request.

The fill status memory 68, in addition to storing the request fill code and request date, stores indications of the status of lines 50 and 52. The Fill Control Logic, upon detecting a Request Fill code in the memory 68 and also detecting in memory 68 that the lowest address of either of the memories 18 or 20 contains a "1", i.e., that the memory 18 or 20 is now empty, controls the scan counter 32 via scan control 24 to begin cycling through the addresses, while writing a "0" into each address location. For example, the logic 24, upon detecting that the memory 18 is empty, would provide a "0" on line 40 and a "write" signal on line 36, with the memory 18 being enabled via line 26. The cycling of the address counter 32 would result in a "0" being written into every address location of the memory 18. When the address counter 32 reaches the last address, it simply stops.

Writing a "0" in the final, or lowest address location removes the memory empty condition indicated on the line 50. The Fill Control Logic 70, upon now detecting that the memory 18 has been filled, erases the Fill Word from the memory 68 and updates the memory 68 to indicate the date of the most recently performed memory fill.

When the memory update malfunctions, or if the subscriber feels that the updating was incorrect, it is not much different than when a buyer of any service feels that the bill is incorrect or that service failures warrant deductions to the bill.

The PPT scheme of this invention may include a novel method for handling subscriber doubts and complaints. The method will require a display. If some form of Teletext service is available for the DBS system, making it possible for information in the video channel to be observed on the subscriber's television set, then the TV set could be used as the display. If Teletext is not available then a simple alpha-numeric LCD display, such as used in a pocket calculator, would be sufficient.

The operation for validating the memory update is interactive. The operation proceeds as follows:

a. The subscriber, feeling the update has been incorrect, calls the DBS office.
b. The DBS office notifies the central computer to transmit the subscriber's address followed by a Read Fill Status EEPROM signal. The latter information will appear in a selected position of the control channel.
c. The "date" code of the most recent fill operation which is stored in the Fill Status EEPROM is "read" and displayed.
d. The subscriber is asked to read the date code. It is keyed into the computer and matched against the transmitted date of the last memory fill. If the date code matches, it is assumed that the subscriber's memory has been properly filled and that the subscriber is incorrect in the complaint. If the date code read by the subscriber doesn't match that of the last transmission, then it is matched against that of the previous transmission. If these match, then it is assumed the last update attempt was not correctly performed. The Fill Status word is sent again and the memory is immediately updated. On the other hand, if the date code read by the subscriber doesn't match that of the previous memory fill transmission, then it is assumed that either the Fill Status Logic has become faulty (it must have been operating for the previous fill, since the subscriber did not complain) or the subscriber is not being truthful. In either case a service call would be necessary.

Optionally, the subscriber can be provided with the capability to regularly monitor his most recent fill date, by simply providing him with a button or other means to generate a "read fill status" signal on line 80.

If the subscriber does not request a memory fill when seeing that the memory status LED 54 is illuminated, the second of the two memories will continue to be decremented until both memory empty status lines 50 and 52 indicate empty memories. At this point, the LED 54 flashes, and the video is periodically interrupted. The subscriber may then have several minutes to call the central office for purchase of additional time before the video is completely interrupted. Upon receiving a call from the subscriber, the Fill word will be immediately sent to the subscriber's decrypter, and the Fill operation returns the subscriber's decrypter to a normal condition.

Considering the forecasted reliability of the decrypter equipment, failure of the PPT circuit will be a rare occurrence. If it does occur and a memory becomes locked up, the subscriber could have unlimited viewing time. For this reason it is essential that fail-safe circuitry be implemented.

The circuitry, designated generally by reference number 16 in FIG. 1, functions as follows. Upon power turn-on, the address of the Address Scan Counter 32 is placed in a register 100. Coincidentally, a timer (not shown) is set which will time out after 10 minutes, a time which is greater than the largest interval between event pulses. During this time interval the Address Scan Counter 32 should have been decremented, and this condition is checked in comparator 104 in response to a timer output on line 106. If it has been decremented, the memory location of that address is checked to ascertain if the location has a "1." If the Address Scan Counter or memory location checks are not validated, a second check is made. If the second check is not validated, then the subscriber must be turned off, an operation which alerts the subscriber to the equipment failure. The "turn off" is a simple operation: a signal is sent via line 110 to the Fill Status EEPROM where it is stored. The Fill Control Logic 70 signals the Address Scan Control 24 as in a memory empty condition, and the latter interrupts the video as it does in the memory empty operation. However, since there is no fill request, the Memory LED 54 does not light. The subscriber, being unaware of what caused the failure, realizes the central office must be notified.

The address scan and memory checks still continue. When these checks finally validate, the Fill Status EEPROM is notified to modify its memory and remove the video interrupt.

As mentioned previously, the forecasted reliability of the decrypter equipment will minimize the chance of a failure mode which permits the subscriber free viewing, and it is possible that the high reliability will make the fail-mode circuitry unnecessary.

Miscellaneous Design Considerations

Since the same address scan counter 32 is used for both "Fill" and "Update" operations, there is the possibility of the two operations conflicting. The conflict is resolved by the address scan control logic 24 which allows a "Fill" operation only after an "Update" operation is completed. Since the "Fill" operation requires a maximum of two seconds (accessing two thousand memory locations and writing to each of them with a write cycle of one millisecond), and the minimum period of the event pulse is set at one minute, a "Fill" operation performed between event pulses will be completed in sufficient time and will not conflict with the event update. The Fill Control Logic determines which memory 18 or 20 is to be updated. This will either be one which is empty or one which is ready to empty. For the latter case, the update does not occur until the memory is completely empty.

The selection of the size of the EEPROMs used for the memories 18 and 20 is made so as to ensure that they will last for the expected useful life of the system. EEPROMs have a limited life in their number of "writes," although the number of "reads" are almost unlimited. Vendor specifications indicate about 10,000 "writes" for an average EEPROM. A more accepted figure, one which allows for sufficient safety margin, is about 1000 "writes."

The number of "writes" received in a ten year period for the EEPROMs of the PPT scheme will depend upon the capacity of the EEPROMs. This capacity can be manipulated to an acceptable memory size, e.g., about 2K bits, so that the maximum number of "writes" to any subscriber is less than four in one month. If over a ten year period a particular subscriber required each month the maximum number of updates, (a highly unlikely event) the total number of "writes" would still be less than five hundred. The EEPROMs will therefore be safeguarded against too many "writes".

The system described herein provides a number of significant advantages. For example, in a typical narrowcasting program situation, e.g., a medical science series, viewers are hesitant to subscribe because of uncertainty of the quality of the program, uncertainty as to whether the hour of the program conflicts with other scheduled events, and because of a general fear of getting locked into another service. PPT solves this problem by allowing the subscriber to narrowcast as desired.

In addition, in a pay TV situation subscribers feel that a great part of their subscription fee supports programs in which they have no interest. Again, PPT solves this problem. After years of forms of pay television in which the public has had little control over programming, the appeal of paying only for what is watched would be great.

Still further, if the time charges for a quality television entertainment are less expensive than an outside entertainment event, the subscriber will often choose the pay-at-home television event. Pay per time television could successfully compete with other forms of entertainment, since the subscriber can immediately select the PPT event.

Finally, in impulse buying for DBS, a bottleneck exists when subscribers try to use the telephone to reach an authorizing office immediately before an event. In the system of the present invention, there are no inquiries and therefore no bottlenecks or lost subscribers.

It will be appreciated that various changes and modifications could be made to the system described above without departing from the spirit and scope of the invention as defined in the appended claims. For example, while the system is described as being activated at power on, it is possible that the PPT technique of this invention will be implemented in a system which includes a number of free programs for a fixed regular fee, so that the PPT scheme would only be activated, and the fail mode circuitry operated, whenever the tuner is tuned to a "premium" channel.

I claim:

1. In a subscriber television system wherein multiple programs are transmitted from a central station to a plurality of subscribers at respective subscriber stations:
    storage means at each subscriber station for storing viewing credit data representing viewing credit;
    means for generating a debit signal in accordance with a fee associated with a program currently being viewed by a subscriber at each said subscriber station;
    means for debiting said stored viewing credit data in accordance with said debit signal;
    means for examining said stored viewing credit to see if it has been updated; and
    means for disabling viewing if the stored viewing credit data has not been updated.

2. In a subscriber television system wherein multiple programs are transmitted from a central station to a plurality of subscribers at respective subscriber stations:
    storage means at each subscriber station for storing an amount of data representing viewing credit, with the viewing credit corresponding to the number of memory locations at which the data are stored;
    means for generating a debit signal in accordance with a fee associated with a program currently being viewed by a subscriber at each said subscriber station; and
    means for decreasing the amount of said stored data in accordance with said debit signal.

3. A system as defined in claim 2, wherein said debiting means erases said data at a rate in accordance with said debit signal.

4. A system as defined in claim 2, further comprising monitoring means at each said subscriber station for determining whether said means for decreasing at that subscriber station is operating properly, and means responsive to said monitoring means for disabling viewing if said means for decreasing is not operating correctly.

5. A system as defined in claim 2, wherein said debiting means comprises means for successively changing the contents stored at successive addressed locations, said system further comprising means for determining if the contents of a presently addressed location have been changed and means for disabling viewing if said presently addressed location have not been changed.

6. A system as defined in claim 2, wherein said storage means comprises first and second memories each for storing credit data, and said debiting means comprises means for erasing data from one of said first and second memories until said one memory is empty and for thereafter erasing data from the other of said memories.

7. A system as defined in claim 2, wherein said storage means comprises a non-volatile memory.

8. A system as defined in claim 7, wherein said memory comprises an EEPROM.

9. A system as defined in claim 2, wherein said debiting signal comprises a pulse generated at a rate corresponding to the charge for a particular program being viewed.

10. A system as defined in claim 9, wherein said rate of said pulse is determined by a control signal sent from said central station.

11. A system as defined in claim 10, wherein said control signal is sent from said central station at a rate corresponding to said pulse rate.

12. A system as defined in claim 2, further comprising means at each said subscriber station for adding data to said stored viewing credit data in response to a fill control signal sent from said central station.

13. A system as defined in claim 12, further comprising means at each said subscriber station for visually indicating to said subscriber the date of the most recent memory fill operation.

14. A system as defined in claim 2, wherein said debiting means comprises means for generating successive memory addresses, said system further comprising:
    first comparing means for comparing generated addresses separated by a predetermined time interval; and
    disabling means for disabling viewing if the compared addresses are not different from one another.

15. A system as defined in claim 14, wherein said debiting means further comprises means for successively changing the contents stored at successive addressed locations, said system further comprising means for determining if the contents of a presently addressed location have been changed, with said disabling means disabling viewing if said compared generated addresses are not different or if said contents of said currently addressed location have not been changed.

* * * * *